(12) United States Patent
Adams (10) Patent No.: US 10,066,811 B2
(45) Date of Patent: Sep. 4, 2018

(54) REVERSIBLE MOUNTING FLANGE AND METHODS OF MANUFACTURE AND USE

(71) Applicant: Peterson Manufacturing Company, Grandview, MO (US)

(72) Inventor: Cory Doyle Adams, Raymore, MO (US)

(73) Assignee: Peterson Manufacturing Company, Grandview, MO (US)

( * ) Notice: Subject to any disclaimer, the term of this patent is extended or adjusted under 35 U.S.C. 154(b) by 0 days.

(21) Appl. No.: 15/061,642

(22) Filed: Mar. 4, 2016

(65) Prior Publication Data

US 2017/0254515 A1   Sep. 7, 2017

(51) Int. Cl.
| | |
|---|---|
| F21V 17/00 | (2006.01) |
| F21V 17/10 | (2006.01) |
| F21V 31/00 | (2006.01) |
| F21V 21/00 | (2006.01) |
| F21W 101/02 | (2006.01) |
| F21W 107/10 | (2018.01) |

(52) U.S. Cl.
CPC ............ *F21V 17/002* (2013.01); *F21V 17/10* (2013.01); *F21V 31/005* (2013.01); *F21V 21/00* (2013.01); *F21W 2101/02* (2013.01); *F21W 2107/10* (2018.01)

(58) Field of Classification Search
CPC ...... F21V 17/002; F21V 17/10; F21V 31/005; F21V 21/00; F21W 2101/02; F21W 2107/10; F16M 13/02
USPC ......... 248/558, 315, 911, 912; 362/257, 459
See application file for complete search history.

(56) References Cited

U.S. PATENT DOCUMENTS

| | | | |
|---|---|---|---|
| 6,357,717 B1* | 3/2002 | Kennard, IV ............. | F16F 1/44 248/562 |
| 8,167,468 B1* | 5/2012 | Olsson ...................... | F21S 8/03 362/101 |
| 8,276,871 B1* | 10/2012 | DeRienzo ............. | A47G 33/126 248/349.1 |
| 2010/0135765 A1* | 6/2010 | Burgess .................... | F04D 7/04 415/1 |
| 2011/0304138 A1* | 12/2011 | Commoner ......... | E21B 43/0122 285/368 |
| 2017/0254515 A1* | 9/2017 | Adams .................. | F21V 17/002 |

* cited by examiner

*Primary Examiner* — Tan Le
(74) *Attorney, Agent, or Firm* — Polsinelli PC; Adam C. Rehm (57) ABSTRACT

A reversible mounting flange capable of being mounted in one of a plurality of configurations and operable to secure any of a plurality of different lenses and related components to a mounting surface in any of a plurality of different positions.

17 Claims, 7 Drawing Sheets

REVERSIBLE MOUNTING FLANGE AND METHODS OF MANUFACTURE AND USE

BACKGROUND

1. Field

The present inventive concept relates generally to a flange for use with a lighting assembly, and more particularly, to a reversible mounting flange capable of being mounted in one of a plurality of configurations and operable to secure any of a plurality of different lenses and related components to a mounting surface in any of a plurality of different positions.

2. Description of Related Art

There are many types of light assemblies of various different shapes and sizes that are available for use on vehicles, trailers, and other transportation equipment applications. When selecting a light assembly for a specific application, a number of factors are considered, e.g., whether a lens of a light assembly needs to be visible from various angles and whether a lens of a light assembly needs to be of a certain size to accommodate components and/or visibility requirements.

Such conventional light assemblies have different designs and, therefore, include components that are specifically designed to accommodate each design. Thus, for example, different ones of the conventional light assemblies may require different flanges of differing sizes and shapes. Each of the different flanges requires separate manufacturing equipment, e.g., molds, and separate manufacturing processes, which collectively increase manufacturing costs and decrease efficiency.

Thus, there exists a need for a flange, a method of manufacturing a flange, and a method of using a flange that do not suffer from the aforementioned deficiencies, that satisfy the aforementioned needs, and that are efficient, economical, and easy to manufacture and utilize.

SUMMARY

In response to the aforementioned needs, the present inventive concept provides a reversible flange having a plurality of configurations and operable to secure any of a plurality of different lenses and related components to a mounting surface in any of a plurality of different positions.

The aforementioned may be achieved in one aspect of the present inventive concept by providing a reversible mounting flange. The flange may include a disc. The disc may include a first face on a first side of the disc and/or a second face on a second side of the disc. Each of the first and/or second faces may provide an abutment surface operable to alternately abut a mounting surface based upon how the flange is installed on the mounting surface.

The flange may include a skirt depending from the disc. The flange may include a ring secured to the skirt. The disc may define an outermost planar perimeter of the flange in a first direction. The skirt may define an outermost planar perimeter of the flange in a second direction that is opposite to the first direction. The disc may define an outermost annular perimeter of the flange in a third direction. The ring may define an innermost annular perimeter of the flange.

The ring may be spaced from the skirt via a connector that may partially define a channel on either side of the connector. Each of the channels may be defined by the skirt, the ring, and/or the connector. The connector may include a plurality of outwardly-extending points. Each of the points may surround the ring. The disc may include a first fastener pattern and a second fastener pattern. Each of the first and second fastener patterns may include a plurality of apertures extending through the disc. Each of the apertures may be operable to receive a fastener at least partially therethrough. The fastener may be operable to abut only one of the abutment surfaces of the faces based on installation of the flange. If the flange is installed so that the abutment surface of the first face abuts the mounting surface, then a head of the fastener may be received to abut the abutment surface of the second face. If the flange is installed so that the abutment surface of the second face abuts the mounting surface, then a head of the fastener may be received to abut the abutment surface of the first face.

The first fastener pattern has a first circumference that may be smaller than a second circumference of the second fastener pattern. The first fastener pattern may extend about an inner portion of the disc. The second fastener pattern may extend about an outer portion of the disc. The skirt may depend from the first side of the disc. The skirt may include a tip that may define an outermost perimeter of the flange. The second face on the second side of the disc may define an outermost planar surface of the flange.

The aforementioned may be achieved in another aspect of the present inventive concept by providing a method manufacturing a reversible mounting flange. The method may include the step of forming a disc including a first face on a first side of the disc and/or a second face on a second side of the disc. Each of the first and second faces may provide an abutment surface operable to alternately abut a mounting surface upon installation of the flange. The method may include the step of forming a skirt depending from the disc. The method may include the step of forming a ring secured to the skirt.

The ring may be spaced from the skirt via a connector that may partially define a channel on either side of the connector. Each of the channels may be defined by the skirt, the ring, and/or the connector. The connector may include a plurality of outwardly-extending points. Each of the points may entirely or partially surround the ring. The disc may include a first fastener pattern and/or a second fastener pattern. Each of the first and second fastener patterns may include a plurality of apertures extending through the disc. Each of the apertures may be operable to receive a fastener at least partially therethrough. The first fastener pattern may extend about an inner portion of the disc. The second fastener pattern may extend about an outer portion of the disc relative to the first fastener pattern. The skirt may depend from the first side of the disc. The skirt may include a tip that defines an outermost perimeter of the flange. The second face on the second side of the disc may define an outermost planar surface of the flange.

The aforementioned may be achieved in another aspect of the present inventive concept by providing a method of using a reversible mounting flange. The method may include the step of selecting one of a plurality of flange mounting configurations. The method may include the step of positioning the flange on a mounting surface based on the selected one of the plurality of flange mounting configurations. The flange may have a disc with a first face on a first side of the disc with a first fastener pattern. The disc may have a second face on a second side of the disc with a second fastener pattern. The method may include the step of fastening the flange to the mounting surface using one of the first fastener pattern and the second fastener pattern. The first or the second fastener pattern may be used if the first face of the first side of the disc is adjacent to the mounting surface. The first or the second fastener pattern may be used if the second face of the second side of the disc is adjacent to the mounting surface. The first fastener pattern may include a first set of apertures extending through the disc. The second fastener pattern may include a second set of apertures extending through the disc. The fastening step may be performed by inserting a plurality of fasteners through each of the first set of apertures if the first face of the first side of the disc is adjacent to the mounting surface. The fastening step may be performed by inserting a plurality of fasteners through each of the second set of apertures if the second face of the second side of the disc is adjacent to the mounting surface. The disc may include a skirt depending from the first side of the disc. The positioning step may include positioning the skirt to extend away from the mounting surface if the first face of the first side of the disc is adjacent to the mounting surface. The positioning step may include positioning the skirt to extend into the mounting surface if the second face of the second side of the disc is adjacent to the mounting surface.

Additional aspects, advantages, and utilities of the present inventive concept will be set forth, in part, in the description which follows and, in part, will be obvious from the description, or may be learned by practice of the present inventive concept.

The foregoing is intended to be illustrative and is not meant in a limiting sense. Many features and subcombinations of the present inventive concept may be made and will be readily evident upon a study of the following specification and accompanying drawings comprising a part thereof. These features and subcombinations may be employed without reference to other features and subcombinations.

BRIEF DESCRIPTION OF THE DRAWINGS

Embodiments of the present inventive concept are illustrated by way of example in which like reference numerals indicate similar elements and in which.

The drawing figures do not limit the present inventive concept to the specific embodiments disclosed and described herein. The drawings are not necessarily to scale, emphasis instead being placed on clearly illustrating principles of certain embodiments of the present inventive concept.

DETAILED DESCRIPTION

The following detailed description references the accompanying drawings that illustrate various embodiments of the present inventive concept. The illustrations and description are intended to describe aspects and embodiments of the present inventive concept in sufficient detail to enable those skilled in the art to practice the present inventive concept. Other components can be utilized and changes can be made without departing from the scope of the present inventive concept. The following description is, therefore, not to be taken in a limiting sense. The scope of the present inventive concept is defined only by the appended claims, along with the full scope of equivalents to which such claims are entitled.

I. Terminology

The phraseology and terminology employed herein are for the purpose of description and should not be regarded as limiting. For example, the use of a singular term, such as, "a" is not intended as limiting of the number of items. Also the use of relational terms such as, but not limited to, "top," "bottom," "left," "right," "upper," "lower," "down," "up," "side," are used in the description for clarity in specific reference to the figures and are not intended to limit the scope of the present inventive concept or the appended claims.

Further, any term of degree such as, but not limited to, "substantially" as used in the description and the appended claims should be understood to include an exact, or a similar, but not exact configuration. For example, "substantially annular" means having an exact annular shape or a similar, but not exact annular shape. Also, a "substantially planar surface" means having an exact planar surface or a similar, but not exact planar surface. Similarly, the terms "about" or "approximately" as used in the description and the appended claims should be understood to include the recited values or a value that is three times greater or one third of the recited values. For example, about 3 mm includes all values from 1 mm to 9 mm, and approximately 50 degrees includes all values from 16.6 degrees to 150 degrees.

Further, as the present inventive concept is susceptible to embodiments of many different forms, it is intended that the present disclosure be considered as an example of the principles of the present inventive concept and not intended to limit the present inventive concept to the specific embodiments shown and described. Any one of the features of the present inventive concept may be used separately or in combination with any other feature. References to terms "embodiment," "embodiments," and/or the like in the description mean that the feature and/or features being referred to are included in at least one aspect of the description. Separate references to terms "embodiment," "embodiments," and/or the like in the description do not necessarily refer to the same embodiment and are also not mutually exclusive unless so stated and/or except as will be readily apparent to those skilled in the art from the description. For example, a feature, structure, process, step, action, or the like described in one embodiment may also be included in other embodiments, but is not necessarily included. Thus, the present inventive concept may include a variety of combinations and/or integrations of the embodiments described herein. Additionally, all aspects of the present disclosure as described herein are not essential for its practice. Likewise, other systems, methods, features, and advantages of the present inventive concept will be or become apparent to one with skill in the art upon examination of the figures and the description. It is intended that all such additional systems, methods, features, and advantages be included within this description, be within the scope of the present inventive concept, and be encompassed by the claims.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. General Architecture

Figure 1:
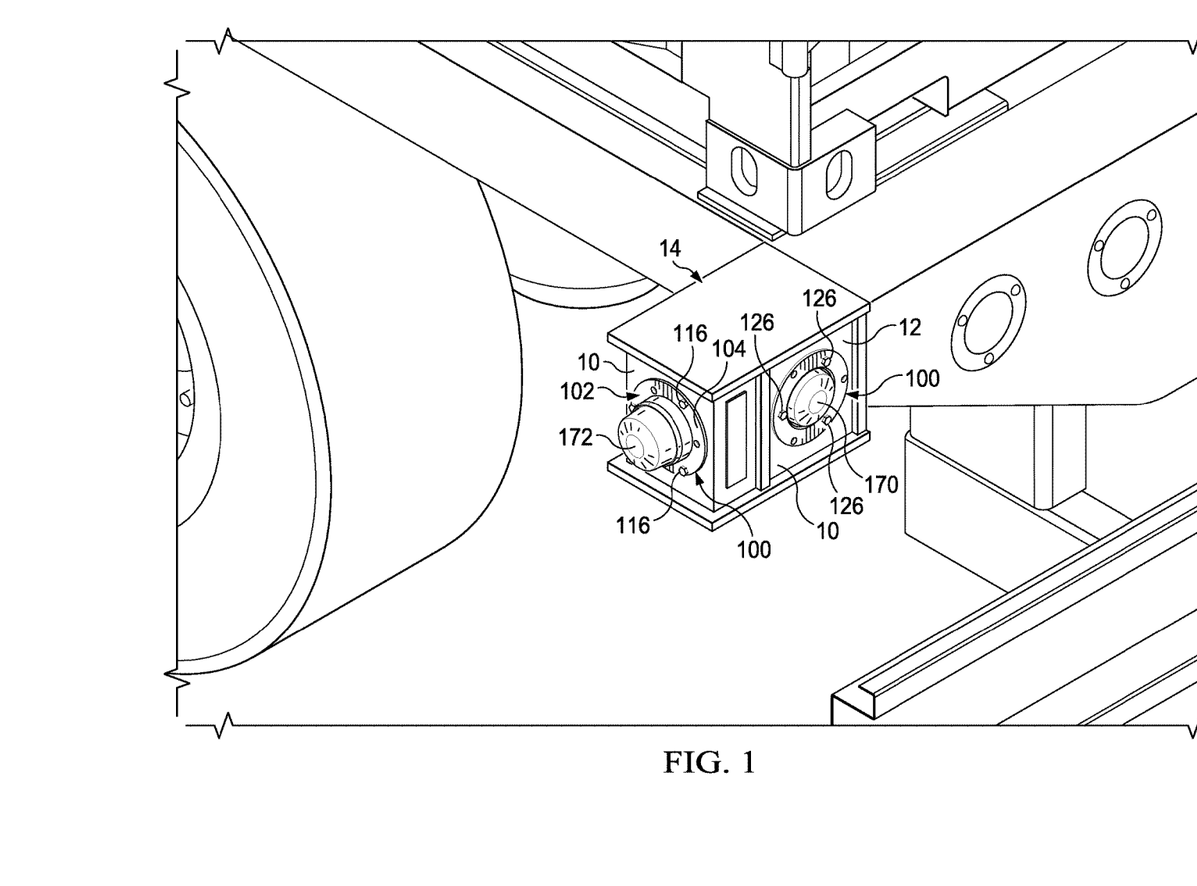
FIG. 1 illustrates a perspective view of flanges of the present inventive concept, each installed on a mounting surface in alternate configurations.
Figure 2:
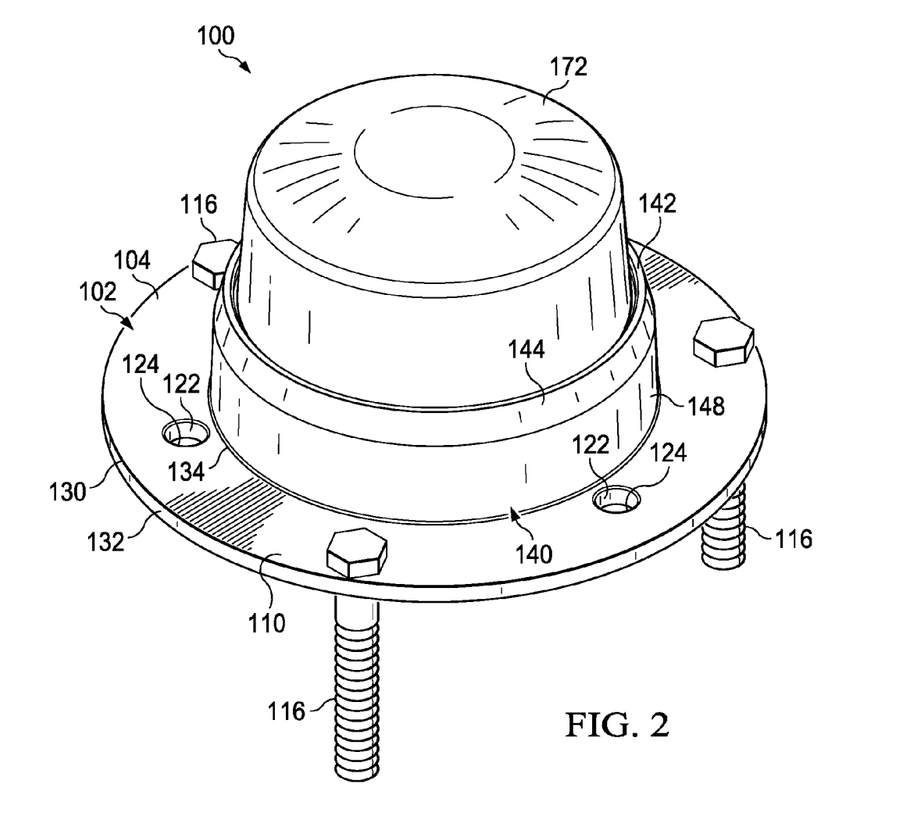
FIG. 2 illustrates a top perspective view of the flange of the present inventive concept, with a lens and a plurality of fasteners, and prior to mounting in one of the configurations shown in FIG. 1.
Figure 3:
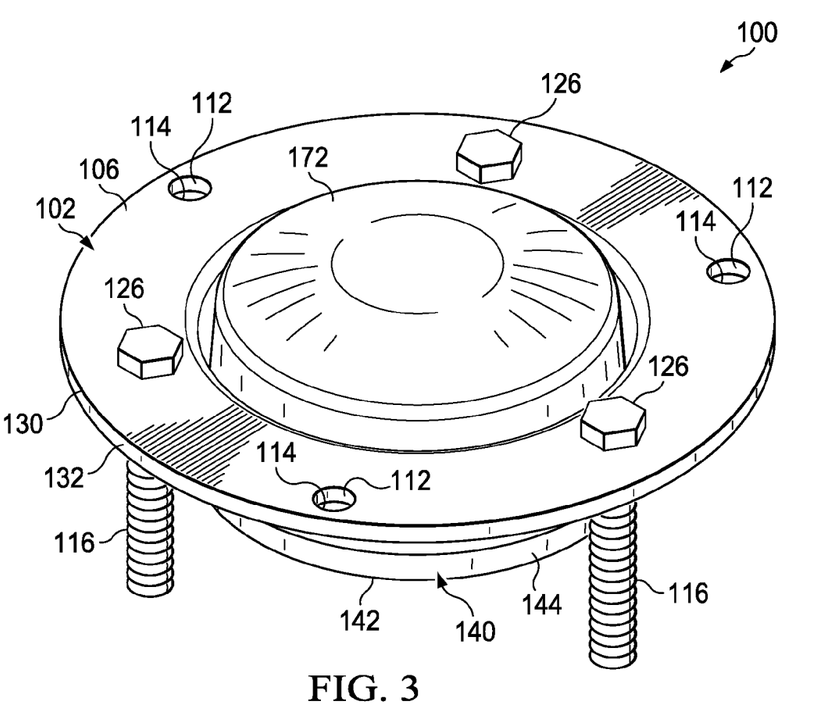
FIG. 3 illustrates a bottom perspective view of the flange of the present inventive concept, with a lens and a plurality of fasteners, and prior to mounting in another one of the configurations shown in FIG. 1.
Figure 4:
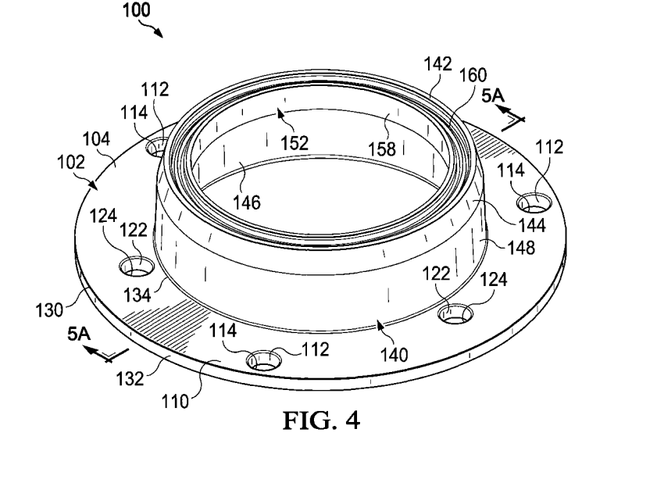
FIG. 4 illustrates a top perspective view of the flange of the present inventive concept, without a lens and a plurality of fasteners, and prior to mounting in one of the configurations shown in FIG. 1.
Figure 5A:
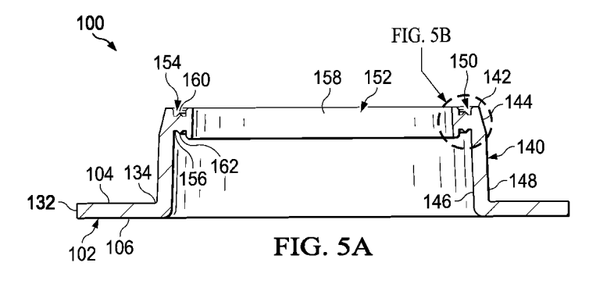
FIG. 5A illustrates an elevated side view of the flange of the present inventive concept taken along the line 5-5 of FIG. 4.
Figure 5B:
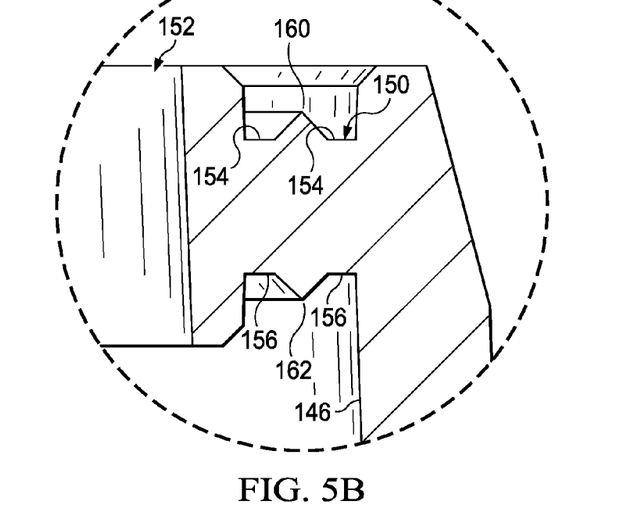
FIG. 5B illustrates a magnified elevated side view of the flange of the present inventive concept taken along the line 5B of FIG. 5A.
Figure 6:
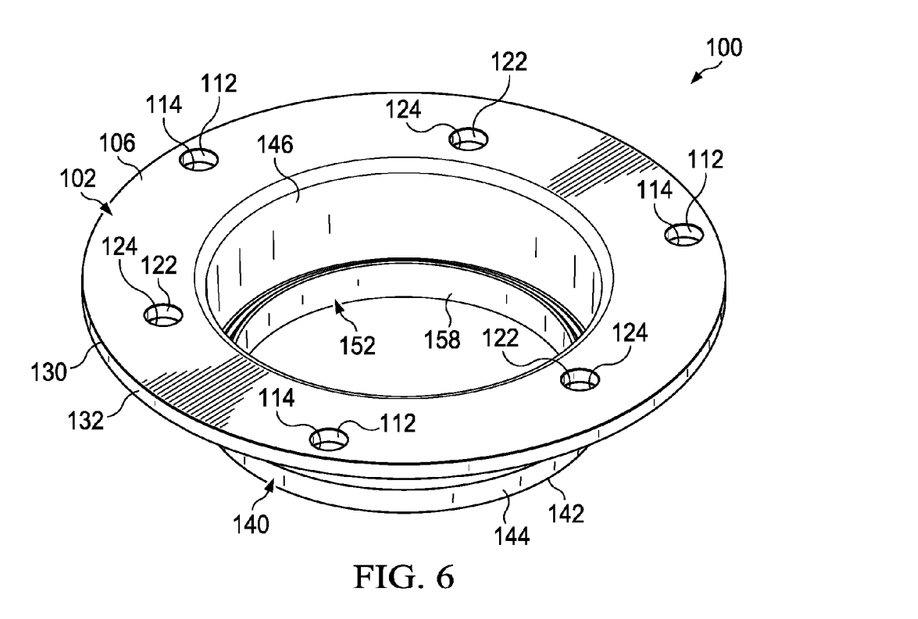
FIG. 6 illustrates a bottom perspective view of the flange of the present inventive concept, without a lens and a plurality of fasteners, and prior to mounting in one of the configurations shown in FIG. 1.
Figure 7:
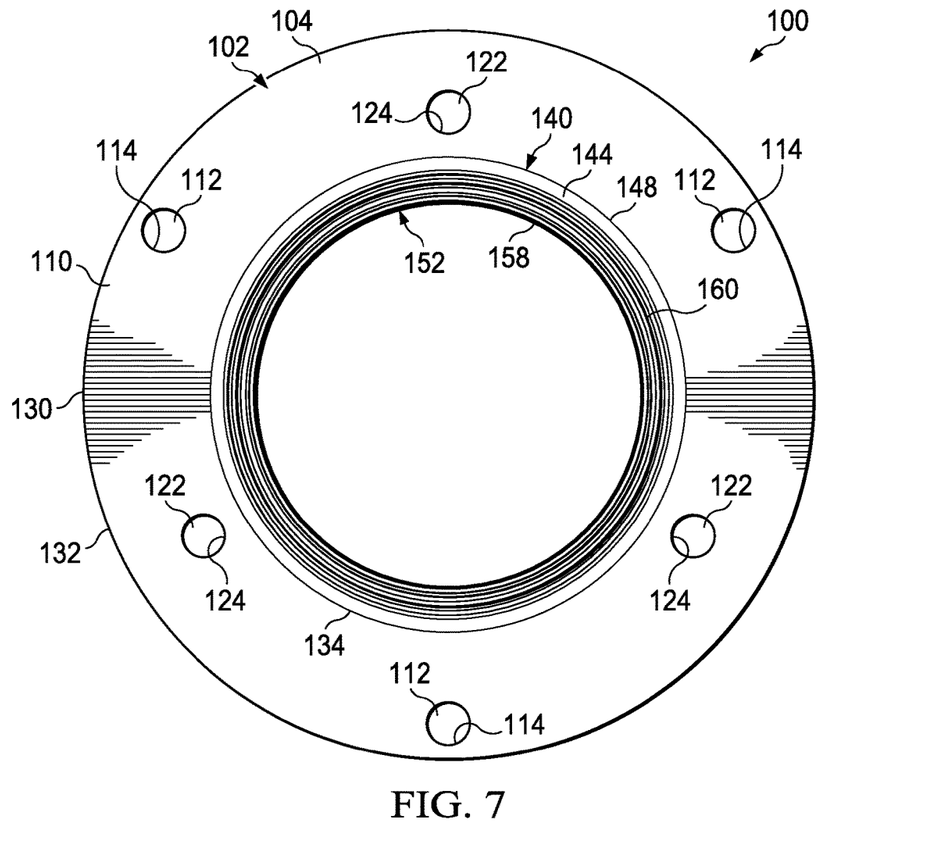
FIG. 7 illustrates a top plan view of the flange of the present inventive concept, without a lens and a plurality of fasteners, and prior to mounting in one of the configurations shown in FIG. 1.
Figure 8:
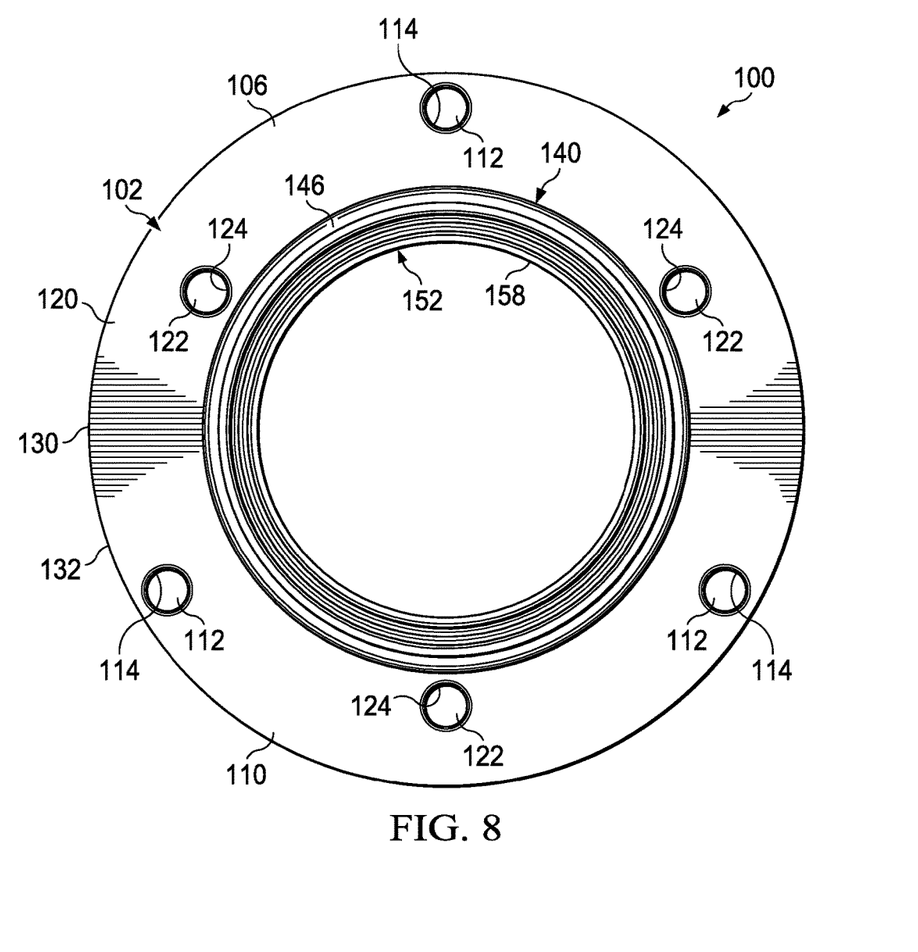
FIG. 8 illustrates a bottom plan view of the flange of the present inventive concept, without a lens and a plurality of fasteners, and prior to mounting in one of the configurations shown in FIG. 1.

Turning to FIGS. 1-8, the present inventive concept provides a reversible flange 100 operable to be mounted on a mounting surface, e.g., mounting surfaces 10, 12 of a trailer 14, in one of two configurations. It is foreseen that the mounting surfaces 10, 12 can be any mounting surface, e.g., a wall, ceiling or other surface of a building, a body panel or other surface of a vehicle, and/or the like, without deviating from the scope of the present inventive concept. The flange 100 includes a substantially annular disc 102 having a substantially uniform thickness, which a first face 104 on a first side of the disc 102, and a second face 106, on a second side of the disc 102. It is foreseen that the flange 100 can be of any shape, e.g., oval, square, rectangular, triangular, or a combination thereof, without deviating from the scope of the present inventive concept.

The first face 104 is substantially planar and includes a first abutment surface 110 operable to abut the mounting surface 10. The first face 104 also includes a first fastener pattern 112, which defines a layout of a first grouping of apertures 114. In the exemplary embodiment, the layout of the first grouping of apertures 114 includes three apertures spaced equidistant to each other about a circumference of the first face 104 of the disc 102. It is foreseen, however, that the layout of the first grouping of apertures 114 could include fewer apertures, e.g., one or two apertures, or more apertures, e.g., four to six apertures, without deviating from the scope of the present inventive concept. Each of the first grouping of apertures 114 extends through the disc 102 and is sized and shaped to receive a fastener, e.g., a first set of bolts 116. Each of the first set of bolts 116 is caused to extend through its respective one of the first grouping of apertures 114 so that a head of each of the first set of bolts 116 abuts the first face 104, thereby causing the flange 100 to be securely mounted to and abut the mounting surface 10, upon installation of the first set of bolts 116 in the flange 100.

The second face 106 is substantially planar and defines an outermost planar perimeter of the flange 100. The second face 106 includes a second abutment surface 120 operable to abut the mounting surface 12. The second face 106 also includes a second fastener pattern 122, which defines a layout of a second grouping of apertures 124. In the exemplary embodiment, the layout of the second grouping of apertures 124 includes three apertures spaced equidistant to each other about a circumference of the second face 106 of the disc 102 that is smaller than the circumference of the first grouping of apertures 114 and closer to a center of the disc 102 than the circumference of the first grouping of apertures 114. It is foreseen, however, that the layout of the second grouping of apertures 124 could include fewer apertures, e.g., one or two apertures, or more apertures, e.g., four to six apertures, without deviating from the scope of the present inventive concept. It is also foreseen that the circumference of the second face 106 of the disc 102 could be larger than the circumference of the first grouping of apertures 114 and/or further away from the center of the disc 102 than the circumference of the first grouping of apertures 114, without deviating from the scope of the present inventive concept. Each of the second grouping of apertures 124 extends through the disc 102 and is sized and shaped to receive at least one fastener, e.g., a second set of bolts 126. Each of the second set of bolts 126 is caused to extend through its respective one of the second grouping of apertures 124 so that a head of each of the second set of bolts 126 abuts the second face 104, thereby causing the flange 100 to be securely mounted to and abut the mounting surface 12, upon installation of the second set of bolts 126 in the flange 100.

At an outermost perimeter 130 of the disc 102 is a perimeter edge 132, which spaces the first face 104 from the second face 106 and defines an outermost perimeter of the flange 100. At an innermost perimeter 134 of the disc 102 is a skirt 140, which depends from the first face 104 on the first side of the disc 102. The skirt 140 is substantially annular, with an inwardly-sloped surface, and includes a tip 142 that extends from a narrowed portion 144 of the skirt 140. The tip 142 defines an outermost perimeter of the flange 100. In the exemplary embodiment, the skirt 140 extends from the first face 104 on the first side of the disc 102 at about 90.1-95 degrees. The skirt 140 has a substantially uniform thickness. Thus, an interior surface 146 of the skirt 140 adjacent to the tip 142 defines an innermost perimeter of the skirt 140 and an exterior surface 148 of the skirt 140 adjacent to the disc 102 defines an outermost perimeter of the skirt 140. Nevertheless, it is foreseen that the skirt 140 may extend from the first face 104 on the first side of the disc 102 at 90 degrees or between about 80 and 100 degrees, without deviating from the scope of the present inventive concept.

Extending from the interior surface 146 of the skirt 140 is a connector 150, which connects a ring 152 to the skirt 140. In this manner, the connector 150 secures the ring 152 in a spaced relationship with the skirt 140. On each side of the connector 150 is a channel 154, 156. The channels, 154, 156 are collaboratively defined by adjoining surfaces of the skirt 140, the connector 150, and the ring 152. Each of the channels 154, 156 of the connector 150 includes an outwardly-extending annular point 160, 162 that completely surrounds the ring 152. The ring 152 includes an interior surface 158 that defines an innermost perimeter of the flange 100. The interior surface 158 extends generally parallel to the interior surface 146 of the skirt 140.

In the exemplary embodiment, the flange 100 is made of acrylonitrile butadiene styrene (ABS) and formed via a plastic molding process, e.g., injection molding or the like. It is foreseen, however, that the flange 100 may be made of another type of plastic, metal, a combination of metal(s) and/or plastic(s), or the like, without deviating from the scope of the present inventive concept.

In use, the flange 100 provides a plurality of flange mounting configurations that may be selected. Specifically, a user of the flange 100 elects whether to mount the flange 100, with the skirt 140 extending inwardly, i.e., extending partially into the mounting surface, e.g., the mounting surface 10, or with the skirt 140 extending outwardly from a mounting surface, e.g., the mounting surfaces 12. It is foreseen that the user may make the decision regarding configuration based on a number of factors including, but not limited to, whether the use of the flange 100 is for an application requiring a smaller lens, e.g., smaller lens 170, or the use of the flange 100 is for an application requiring a larger lens, e.g., larger lens 172. Additionally, the user may make the decision regarding configuration based on whether an application requires a substantially flush mount, e.g., via the lens 172, or whether an application requires a protruding mount, e.g., via the lens 170 that provides substantially increased visibility from various angles relative to the lens 172.

Based on the configuration selected by the user, the flange 100 is positioned on a mounting surface, e.g., one of the mounting surfaces 10, 12. If the user has selected to use lens 170, the flange 100 is positioned so that the second face 106 on the second side of the disc 102 abuts the mounting surface. Alternately, if the user has selected to use the lens 172, the flange 100 is positioned so that the first face 104 on the first side of the disc 102 abuts the mounting surface. Based on the configuration selected by the user, one of the fastener patterns 112, 122 is used. Specifically, the fastener pattern 112 is used if the first face 104 of the first side of the disc 102 is adjacent to the mounting surface. Alternatively, the fastener pattern 122 is used if the second face 106 of the second side of the disc 102 is adjacent to the mounting surface. After positioning of the flange 100 on the mounting surface, the flange 100 is removably secured thereto via the bolts 116, which are installed in each of the apertures 114, or via the bolts 126, which are installed in each of the apertures 124. It is foreseen that the bolts 116, 126 and/or the lens 170, 172 can be secured to the flange 100 at any time, e.g., prior to positioning the flange 100 on the mounting surface or before positioning the flange 100 on the mounting surface, without deviating from the scope of the present inventive concept. It is also foreseen that the lens 170, 172 can be permanently secured to the flange 100, e.g., via an adhesive, welding, or the like, without deviating from the scope of the present inventive concept. It is also foreseen that one or more annular gaskets can be sized and shaped to fit entirely within one or both of the channels 154, 156, thereby abutting one of the points 160, 162 and forming a water-impermeable seal between the flange 100 and the lens 170, 172, without deviating from the scope of the present inventive concept.

In this manner, the flange 100 of the present inventive concept is operable to be mounted in one of a plurality of configurations and operable to secure any of a plurality of different lenses and related components to a mounting surface in any of a plurality of different positions, thereby remedying the aforementioned problems of conventional light assemblies.

Having now described the features, discoveries, and principles of the present disclosure, the manner in which embodiment of the present disclosure are constructed and used, the characteristics of the construction, and advantageous, new and useful results obtained; the new and useful structures, devices, elements, arrangements, parts and combinations, are set forth in the appended claims.

The following claims are intended to cover all of the generic and specific features of the present disclosure herein described, and all statements of the scope of the present inventive concept, which, as a matter of language, might be said to fall there between.

What is claimed is:

1. A reversible mounting flange comprising:
   a disc including a first face on a first side of the disc and a second face on a second side of the disc, each of the first and second faces providing an abutment surface operable to alternately abut a mounting surface upon installation of the flange;
   a skirt depending from the disc; and
   a ring secured to the skirt,
   wherein,
      the disc includes a first fastener pattern and a second fastener pattern, each of the first and second fastener patterns including a plurality of apertures extending through the disc, each of the apertures operable to receive a fastener at least partially therethrough, and
      the first fastener pattern has a first circumference that is smaller than a second circumference of the second fastener pattern.

2. The reversible mounting flange of claim 1,
   wherein,
      the disc defines an outermost perimeter of the flange, and
      the ring defines an innermost perimeter of the flange.

3. The reversible mounting flange of claim 1,
   wherein,
      the ring is spaced from the skirt via a connector that partially defines a channel on either side of the connector, and
      each of the channels are defined by the skirt, the ring, and the connector.

4. The reversible mounting flange of claim 3,
   wherein,
      the connector includes a plurality of outwardly-extending points, and
      each of the points surround the ring.

5. The reversible mounting flange of claim 1,
   wherein,
      the fastener is operable to abut only one of the abutment surfaces of the faces based on installation of the flange.

6. The reversible mounting flange of claim 1,
   wherein,
      if the flange is installed so that the abutment surface of the first face abuts the mounting surface, then the fastener is received to abut the abutment surface of the second face, and
      if the flange is installed so that the abutment surface of the second face abuts the mounting surface, then the fastener is received to abut the abutment surface of the first face.

7. The reversible mounting flange of claim 1,
   wherein,
      the first fastener pattern extends about an inner portion of the disc, and
      the second fastener pattern extends about an outer portion of the disc.

8. The reversible mounting flange of claim 1,
   wherein,
      the skirt depends from the first side of the disc.

9. The reversible mounting flange of claim 1,
   wherein,
      the skirt includes a tip that defines an outermost perimeter of the flange, and the second face on the second side of the disc defines an outermost planar surface of the flange.

10. A reversible mounting flange comprising:
a disc including a first face on a first side of the disc and a second face on a second side of the disc, each of the first and second faces providing an abutment surface operable to alternately abut a mounting surface upon installation of the flange;
a skirt depending from the disc; and
a ring secured to the skirt,
wherein,
the disc includes a first fastener pattern and a second fastener pattern, each of the first and second fastener patterns including a plurality of apertures extending through the disc, each of the apertures operable to receive a fastener at least partially therethrough,
the skirt depends from the first side of the disc,
the skirt includes a tip that defines an outermost perimeter of the flange, and
the second face on the second side of the disc defines an outermost planar surface of the flange.

11. The reversible mounting flange of claim 10, wherein,
the disc defines an outermost perimeter of the flange, and
the ring defines an innermost perimeter of the flange.

12. The reversible mounting flange of claim 10, wherein,
the ring is spaced from the skirt via a connector that partially defines a channel on either side of the connector, and
each of the channels are defined by the skirt, the ring, and the connector.

13. The reversible mounting flange of claim 12, wherein,
the connector includes a plurality of outwardly-extending points, and
each of the points surround the ring.

14. The reversible mounting flange of claim 10, wherein,
the fastener is operable to abut only one of the abutment surfaces of the faces based on installation of the flange.

15. The reversible mounting flange of claim 10, wherein,
if the flange is installed so that the abutment surface of the first face abuts the mounting surface, then the fastener is received to abut the abutment surface of the second face, and
if the flange is installed so that the abutment surface of the second face abuts the mounting surface, then the fastener is received to abut the abutment surface of the first face.

16. The reversible mounting flange of claim 10, wherein,
the first fastener pattern has a first circumference that is smaller than a second circumference of the second fastener pattern.

17. The reversible mounting flange of claim 10, wherein,
the first fastener pattern extends about an inner portion of the disc, and
the second fastener pattern extends about an outer portion of the disc.

* * * * *